United States Patent

[11] 3,616,087

[72] Inventors Nelson R. Henry;
Donald R. Middour, both of Decatur, Ga.
[21] Appl. No. 863,834
[22] Filed Oct. 6, 1969
[45] Patented Oct. 26, 1971
[73] Assignee The Woodman Company, Inc.
Decatur, Ga.

[54] SEALING CARRIAGE
13 Claims, 5 Drawing Figs.
[52] U.S. Cl. .................................................. 156/518,
156/251
[51] Int. Cl. ..................................................... B32b 31/20
[50] Field of Search ........................................ 53/182;
156/518, 530, 251; 74/520

[56] References Cited
UNITED STATES PATENTS
2,837,883  6/1958  Bracey ........................... 53/182
3,388,525  6/1968  Thesing et al. ................. 53/182
3,473,288  10/1969 Nakamura et al. ............. 53/182

Primary Examiner—Benjamin A. Borchelt
Assistant Examiner—James V. Doranius
Attorney—Lowe and King ABSTRACT: A sealing carriage for packaging machines wherein transverse seals are formed across a tube of packaging film; the sealing jaws being actuated by a toggle linkage including at least a pair of links jointed together for each slide. At least one of the links of a pair has sufficient resiliency to allow said linkage to travel slightly beyond the point where the sealing jaws come together to assure a high-pressure seal. The resilient link is substantially U-shaped and the two links of each pair are proportioned in length to give equal sealing jaw travel. The carriage is provided with a cutoff knife having an actuator bar with a closed slot in the direction of travel of the slide. Operation of the knife is effected by movement of the end of the actuator bar against an operating lever and a tension spring supports the operating end of the actuator bar for floating action.

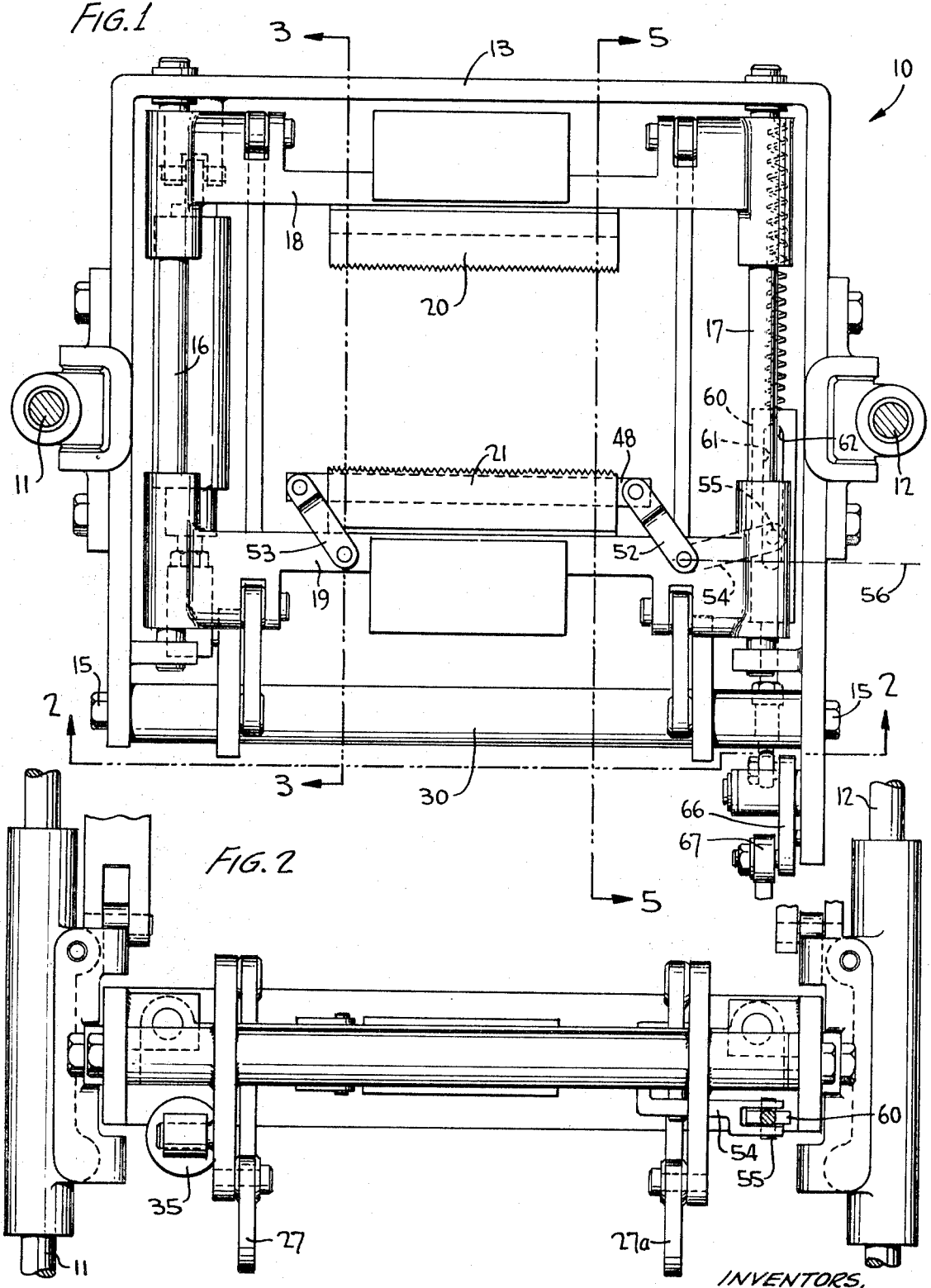

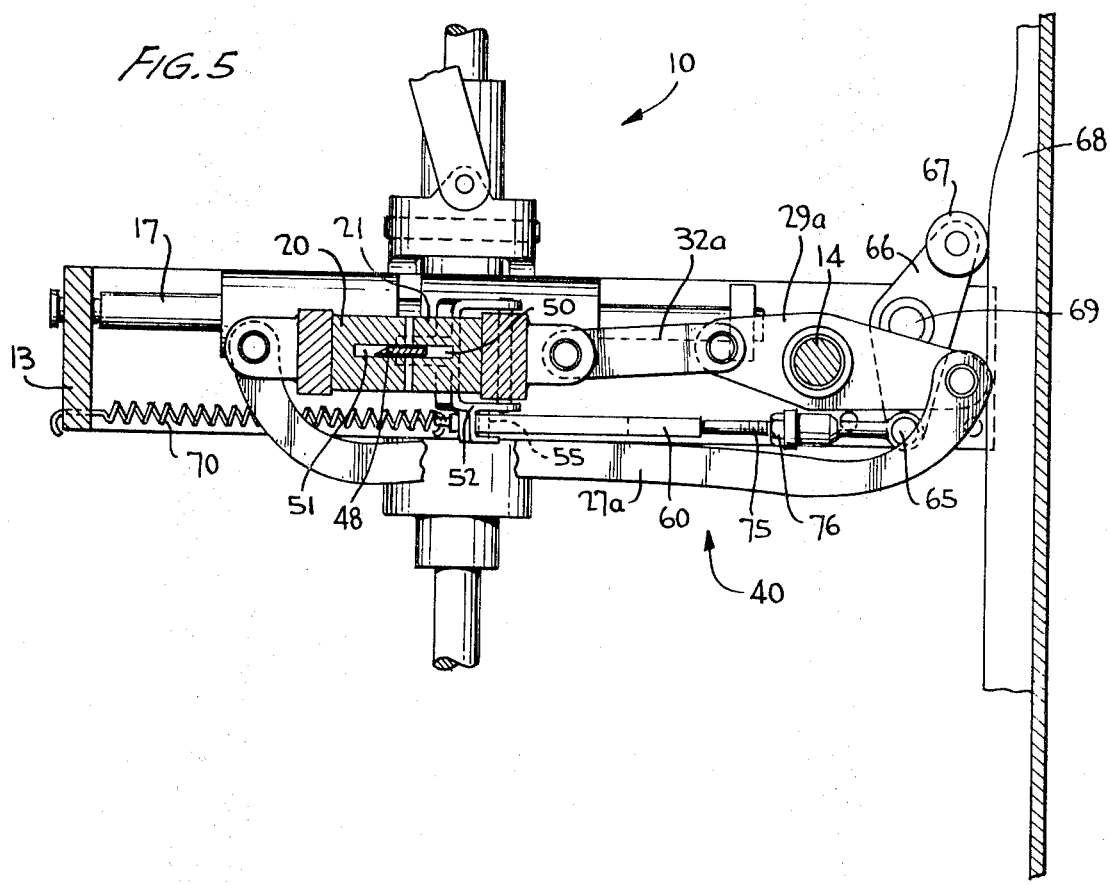

SEALING CARRIAGE

The present invention relates to packaging machines, and more particularly, to a carriage for reciprocatory sealing jaws utilized to form transverse seals on a tube of packaging film.

In a form and fill packaging operation, packaging film is unwound from a roll and passed over a former to form a tube; the opposite longitudinal edges being heat-sealed together. A pair of sealing jaws are brought together against the tube to form transverse seals, completing the pillowlike package below by forming the top seal and simultaneously forming the bottom seal for the next package above. After each package has been formed, the carriage for the sealing jaws moves downwardly to draw out another package length of film whereby the operation is repeated.

Heretofore, bringing the sealing jaws together has been successfully performed by opposed air cylinders, the piston rods of which are attached directly to the sealing jaws. The use of air cylinders directly coupled to the sealing jaws gives the necessary resiliency and high pressure needed to form the airtight seal to conserve the freshness of the product being packaged, as well as allowing the high-speed operation necessary for efficient utilization of the packaging machine.

The toggle linkage is a well-known mechanical device for providing reciprocatory motion to members. In such a device, two bars or links are jointed together end to end but not in a straight line, so that when a force is applied tending to straighten the "knee," the member that is free to move is given motion. It has been proposed to use such toggle linkages in opposed relationship to each other to move the sealing jaws of packaging machines toward and away from each other. However, because of the very high pressure needed to successfully operate sealing jaws, some arrangement equivalent to the resiliency gained in opposed air cylinders is required before a successful seal can be made. One such proposal for adapting a toggle linkage to operating reciprocatory sealing jaws is shown by the U.S. Pat. to Newell et al. 3,061,989, issued Nov. 6, 1962. This patent proposes the resilient mounting of at least one of the sealing jaws on the supporting slide in an attempt to gain the same type of action received by operating the sealing jaws directly from pneumatic cylinders.

One shortcoming of resiliently mounting the sealing jaw on the slide results from the inherent "bouncing" of the sealing jaws as they come together. This effect results in seals being formed which are imperfect, weak due to lack of firm pressure, or wrinkled due to a relative motion between the jaws before finally coming together; the wrinkles being apt to be formed as the jaws momentarily open during the "bounce." Also, in such an arrangement, the resilient mounting of the sealing jaw allows slight transverse or sidewise relative movement between the jaws destroying the registration of the operative faces of the sealing jaws.

Also, since the sealing jaws must be maintained at a high temperature (in the neighborhood of 250° F.) the mounting springs for the jaws tend to weaken, thereby requiring adjustment and eventually replacement after only a short period of use due to a constant annealing process of the metal. The weakening or failure of a mounting spring and the continued operation of the sealing jaws results in a number of packages formed with imperfect seals due to reduction of the critical high pressure required between the jaws.

The use of a toggle linkage allows the sealing jaws to be operated with the high pressure but with only a single air cylinder rather than two due to the considerable mechanical advantage gained through said linkage. This represents a significant step toward more efficient operation of the machine because of the reduction in the volume of air needed. Similarly, there has been a need to eliminate the operation of the cutoff knife by air cylinder means by replacement with a mechanical linkage arrangement. There is a problem in this regard since the cutoff knife which is mounted on one of the sealing jaws must not only move up and down with the carriage during the drawing stroke, but also in and out with the sealing jaw on the slide during each sealing operation. Further complicating the matter is the fact that the knife must be precisely coordinated with the sealing operation in order that the cutting be performed exactly at the right time after the seal has been completed.

Accordingly, it is one overall object of the present invention to successfully reduce the amount of air needed to operate a sealing carriage to minimize the air volume required per packaging machine.

It is another object of the present invention to provide a toggle mechanism which simulates the operation of direct opposed air cylinders for sealing jaws.

It is still another object of the present invention to provide a toggle mechanism which has resilient action and yet is not subject to bounce upon coming together at high speed for performing the sealing operation.

It is still another object of the present invention to provide a resilient characteristic to reciprocatory sealing jaws without subjecting parts to a constant annealing process thereby tending to change the resilient characteristic of the parts and cause eventual failure.

Still another object of the present invention is to provide a cutoff knife which is operated without the use of air cylinder means.

Another and related object of the present invention is to provide a cutoff knife on a sealing jaw carriage which has an operating means for the cutoff knife subject to floating action to allow the required up-and-down and in-and-out movement of the sealing jaws.

To briefly summarize the first feature of importance relating to the present invention, a sealing carriage is provided with sealing jaws which are rigidly mounted on reciprocatory slides adapted to move toward and away from the tube of packaging film to form the transverse seals. To successfully employ the toggle linkage to operate the slides in accordance with the above objects and to gain the related advantages, the present invention teaches providing at least one of the links with sufficient resiliency to allow the toggle linkage to travel slightly beyond the point where the sealing jaws come together. With this arrangement, the sealing jaws are assured of firm, high-pressure engagement with the tube of packaging film in between so as to form a uniform high-pressure seal during each sealing operation.

The link designated for resiliency preferably includes a curved portion with the bending occurring along the length so as to tend to straighten the same. Further advantage is gained by making the link substantially U-shaped with an elongated straight portion between the curved portions at the end, said straight portion having sufficient flexibility to bow toward the interior of the U for resiliency. The link is fabricated of spring material, such as high tensile spring steel, to give the desired properties and because of the remoteness from the sealing jaw is not subjected to the deleterious annealing processes during each sealing operation.

When two pairs of links are used and a common actuating level is employed adjacent one sealing jaw, one link is substantially longer than the others with this link being selected for the resilient feature. The designated link, being longer, will move through a lesser angle with respect to its sealing jaw than the corresponding link of the other pair, so that the radius for operation of said links is proportionally varied to give equal sealing jaw travel. A single air cylinder is selected to operate directly on the common lever at a radius corresponding with the mechanical advantage desired.

In accordance with another feature of the present invention, the use of air to operate the cutoff knife is completely eliminated. The knife is operated in timed relationship with the sealing operation through a cam mounted in the path of up-and-down movement of the carriage. The heart of the invention with regard to this feature lies in the provision of an actuator bar movable in the direction of the slide carrying the knife, which actuator bar is provided with a closed slot at a free end thereof. A slide mounted operator moves along the slot as the sealing jaws move toward and away from the packaging tube. A tension spring provides floating action at the free end of the actuator bar to accommodate the preferred pivotal movement of the knife.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIG. 1 is a top view of the sealing carriage constructed in accordance with the teachings of the present invention;

FIG. 2 is an end view and partial cross-sectional view of the sealing carriage of the invention as denoted by the line 2—2 of FIG. 1;

FIG. 5 is a cross-sectional view taken along line 5—5 of FIG. 1 looking toward the right side of the sealing carriage as viewed in that figure.

Figure 3:
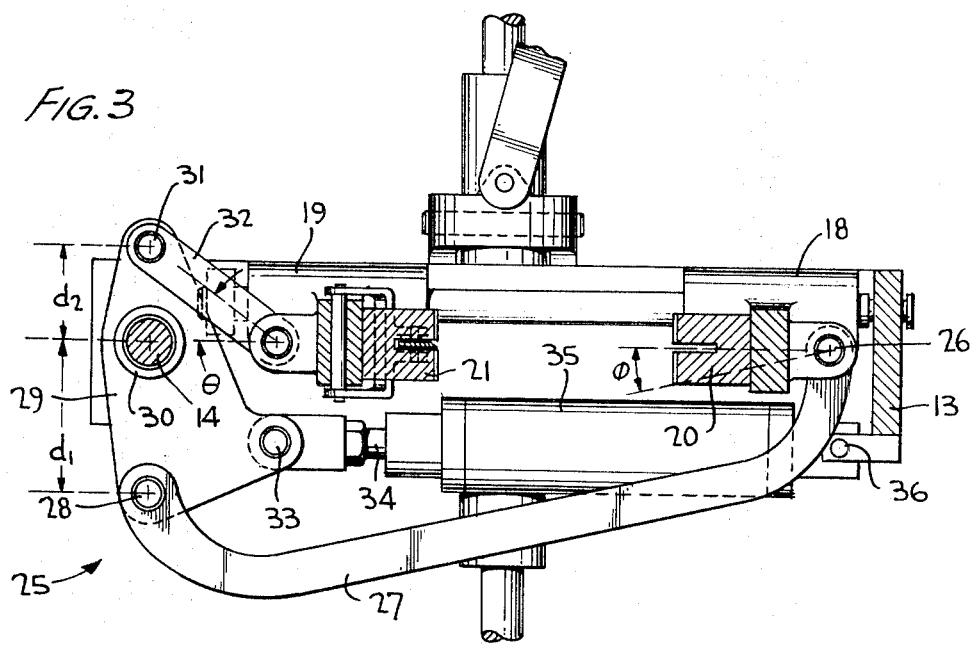
FIG. 3 is a cross-sectional view looking toward the left side of FIG. 1, as denoted by the line 3—3.

With specific reference now to the drawings showing a preferred embodiment of the present invention, a more detailed analysis of the two important features of the present invention can be made. In FIG. 1, there is shown a sealing carriage 10 which is adapted for reciprocatory movement in a vertical direction along slide rods 11, 12 (see FIG. 2 also); which movement is to draw out successively lengths of packaging film. The carriage frame may consist of a U-shaped frame member 13, the open end being closed by a transverse shaft 14 (see FIGS. 3 and 4), the ends of said shaft being secured by suitable bolts 15, as illustrated in FIG. 1. Running the length of the sealing carriage 10 are a pair of guides 16, 17 which carry forward and rear slides 18, 19 adapted for movement in substantially a horizontal plane. Rigidly mounted on the slides 18, 19 are cooperating sealing jaws 20, 21 which are adapted to be positioned on opposite sides of a tube of packaging film (not shown in any of the FIGS.) in a manner well known in the form and fill packaging art. The sealing jaws 20, 21 are provided with heating elements which are closely controlled in temperature and have mating serrated faces to form the usual ridges in the seal area. Any significant amount of heat that could be transferred from the sealing jaws 20, 21 to the other parts of the sealing carriage 10 is advantageously confined in accordance with the present invention only to the slides 18, 19 which serve as a heat sink from where said heat can be harmlessly dissipated to the atmosphere by radiation.

Figure 4:
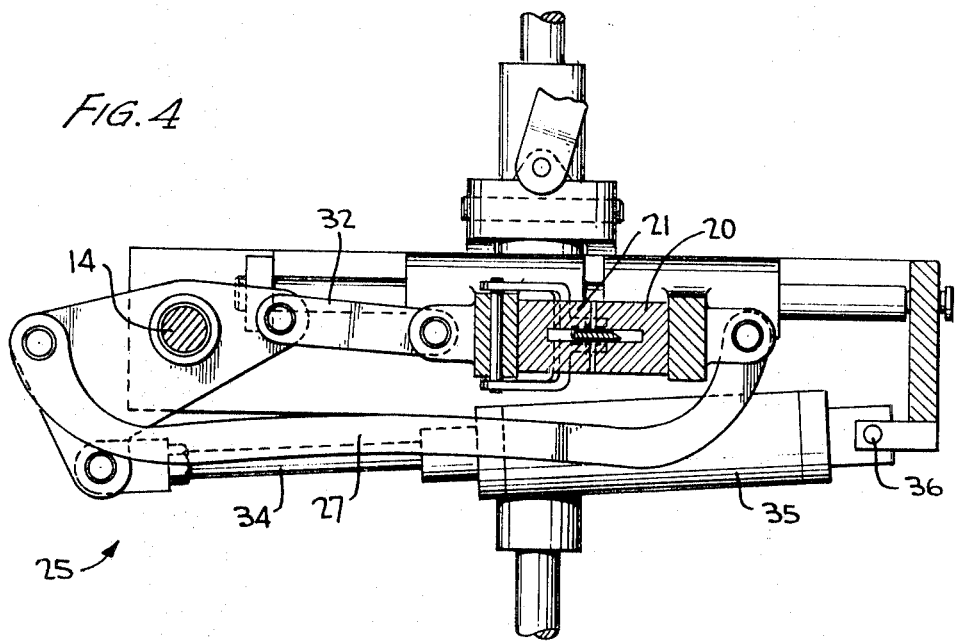
FIG. 4 is the same cross-sectional view as FIG. 3 except with the sealing jaws in a closed position and the cutoff knife actuated.

A toggle linkage, as generally referenced by the numeral 25 and constructed in accordance with the principles of the present invention, can best be seen in its two modes of operation in FIGS. 3 and 4; (1) the retracted mode wherein the sealing jaws are separated to allow an open tube of packaging film to project therebetween, and (2) a sealing and cutting mode in which the packaging film is squeezed between the sealing jaws 20, 21 and cut in the middle of the seal, respectively. Pivotally connected to the forward slide 18 by a suitable pin 26 is a U-shaped link 27, which in turn is pivotally attached at a joint 28 to a combination lever 29 carried by a pivotal sleeve 30 on the transverse shaft 14. The distance $d_1$ from the center of the shaft 14 to the center of the joint 28 forms the other link of the first toggle device that includes the U-shaped link 27.

The distance $d_2$ from the center of the shaft 14 to another joint 31 corresponds to the distance $d_1$ for the first toggle device and forms a link of the second toggle device that operates the rear slide 19. The joint 31 and the rear slide 19 are interconnected by link 32 which thus completes the second toggle device. It will be noted that the link 32 travels through a substantial angle $\theta$ with respect to the horizontal, approximately 45° (see FIG. 3); whereas the link 27 travels through a much smaller angle $\Phi$, approximately 10° (also, see FIG. 3). For this reason, the distance $d_1$ on the lever 29 is proportionally greater than the distance $d_2$ in order for the jaws 20, 21 to travel the same distance, in accordance with the present invention. The lever 29 carries a pivot pin 33 which is connected to piston rod 34 of pneumatic cylinder 35. In order to allow free action of the cylinder 35 during the power stroke to operate the jaws 20, 21, the rear of the same is pivotally mounted by pin 36 on the U-shaped frame member 13.

With reference to FIG. 5 of the drawings, it can be seen that the opposite end of the slides 18, 19 (note right-hand side of FIG. 1) carries similar toggle linkage, generally designated by the reference numeral 40. This additional linkage 40 is for the purpose of insuring that full pressure is gained across the width of the sealing jaws 20, 21 and has like elements designated by like reference numerals except for the suffix $a$ for further identification. With the use of the sleeve 30 to positively connect the levers 29, 29$a$ additional power means on the right side of the carriage 10 has been found to be not needed.

In the clamped mode of the sealing jaws, 20, 21 shown in FIGS. 4 and 5, the deflection of the links 27, 27$a$ may be observed (slightly exaggerated for clarity) which gives the desired resiliency to the toggle linkages 25, 40. The links 27, 27$a$ have sufficient resiliency to allow the linkages, 25, 40 to travel slightly beyond the point where the sealing jaws 20, 21 come together. The most important aspect of this feature is that there is assurance with this overtravel that the firm pressure necessary to give a high-pressure seal during each sealing operation is without question.

The links 27, 27$a$ have equal curved portions at the ends thereof. As the piston rod 34 moves the linkages 25, 40 to the clamped position of the sealing jaws 20, 21, the links 27, 27$a$ bow toward the interior of the U, or as put another way are distorted such as to tend to straighten themselves. The flexibility, and thus the critical resiliency of the links 27, 27$a$, is carefully chosen to prevent the sealing jaws 20, 21 from "bouncing" upon forceful contact. Another reason for this desirable action is that the links 27, 32 are extending substantially horizontal and are moving positively in the direction of travel of the sealing jaws 20, 21 so as not to generate any "whipping" action or exhibit any general springiness under the substantial force of said jaws 20, 21 coming together. For even though the speed of the jaws 20, 21 reduces considerably as the "knee" of the linkage 25, 40 straightens, the force of coming together is sufficient to cause momentary reverse travel or "bouncing" of said jaws 20, 21 when the jaws 20, 21 are themselves spring mounted on the slides as in the past. Also, since both of the sealing jaws 20, 21 are rigidly mounted on the slides 18, 19 the force of engagement is advantageously transferred to the guide rails 16, 17 and any tendency for transverse vibration is eliminated.

The levers 29, 29$a$ are accurately positioned with respect to the sleeve 30 so that the links 27, 27$a$ flex substantially the same amount to make certain that the seal across the full face of the sealing jaws 20, 21 is uniform. The strength of the sleeve 30 to resist torsional displacement is maximized due to the body of the same being at an increased radius from the center of the pivot point or the center of shaft 14. Also, the shaft 14 which extends along the full length of the sleeve 30 serves to reinforce the complete toggle action to further maintain the pressure constant across the face of the sealing jaws 20, 21.

In accordance with the other important feature of the present invention, the rear sealing jaw 21 is provided with a cutoff knife 48 located in a slot 50 along the longitudinal face; said knife moving forwardly and into a corresponding slot 51 in the forward sealing jaw 20 through a mechanical linkage arrangement not involving the use of pneumatics. In the retracted or inoperative position, which is shown in FIG. 1, the cutoff knife 48 is positioned below the face of the sealing jaw 21.

Preferably, the knife 48 is mounted by a pair of double yokes 52, 53 so as to sweep outwardly and across with respect to the sealing jaws 20, 21 when actuated. The operator means for the knife 48 includes a pivotal lever 54 connected to the pivot of the right support yoke 52 and pin 55 carried by the end thereof. The lever 54 operates in a horizontal plane from approximately 10° forward toward the sealing jaw 20 to an equal angle rearwardly; all with respect to transverse center line 56. When passing through the centerline 56, it will be appreciated that the end of the lever 54 is thus subject to transverse movement and is accommodated as will be seen later in detail.

The pin 55 is operated by an actuator bar 60 which has a slot 61 to receive the same. It is known that the cutoff knife 48 is desired to be actuated only after the seal has been made by bringing together the sealing jaws 20, 21. For this reason, the length of the slot 61 is substantially equal to the travel of the slide 19 during the sealing operation. Thus, when the slide 19 has been advanced to the sealing position, end 62 of the slot 61 on the free end of the actuator bar 60 embraces the pin 55 and is now in readiness to actuate the cutoff knife 48.

To illustrate such actuation of the cutoff knife with the sealing jaws 20, 21 in engagement, reference is first made to FIG. 5 wherein the actuator bar 60 is shown pivotally mounted by pivot pin 65 on a lever 66 having a follower 67 mounted thereon. As the entire carriage 10 moves on the downward drawing stroke, the high portion of cam 68 forces the follower 67 to the left (as viewed in FIG. 5), rotates the lever 66 about pivot 69 which in turn moves the actuator bar 60 and the engaged pin 55 to the right. This causes the cutoff knife 48 to swing out on the yokes 52, 53 and enter the slot 51 on the forward sealing jaw 20 thus severing the tube of packaging film along the longitudinal center of the seal area. As will be understood, the lower half of the sealing jaws 20, 21 has thus formed the final top seal of the package below and the upper half has formed the bottom seal of the next successive package.

The jaws 20, 21 are now ready for immediate opening. As the sealing jaw 21 is moved rearwardly, as viewed in FIG. 1, the pin 55 moves along the slot 61. Complete retraction of the cutoff knife 48 into the slot 50 is accomplished when the opposite end of the slot 61 is brought forward against the pin 55, as the carriage 10 moves upwardly on the return stroke thus bringing the follower 67 to the lower portion of the cam 68.

This forward motion of the actuator bar 60 and the floating action to accommodate the slight transverse movement of the pin 55 about the transverse centerline 56 is accomplished by a tension spring 70 mounted between the U-shaped frame 13 and the forward tip of the actuator bar 60 (see FIG. 1). The tension spring 70 thus maintains the actuator bar 60 constantly biased forward with the follower 67 on the lever 66 in biased engagement with the cam 68. Since the spring 70 is the sole support for the forward tip of the actuator bar 60 other than the lever 54, the sidewise floating action of said lever 54 is allowed as needed. The pivot pin 65 is the sole support for the rear end of the actuator bar 60. There is also provided a threaded portion 75 on the actuator bar 60 for adjustability; the locknut 76 serving to maintain the adjustment once set.

To summarize the salient features of the sealing carriage 10 of the present invention, it can be seen that (1) the novel toggle linkage 25, 40 alleviates problems of the prior art centered around the need for resilient engagement of the sealing jaws 20, 21, and (2) the actuating mechanism for the cutoff knife 48 performs the associated cutting operation in a significantly improved manner. The resiliency of the links 27, 27a of the toggle linkages 25, 40 is the key to assuring a uniform, high-pressure seal across the full width of the packaging film. Further, the elimination of springs on the sealing jaws 20, 21 and the resultant problem of weakening of the springs by a continuous annealing process gives significant advantages in terms of reliability, as well as reduced down time since replacement of these springs is no longer needed. The floating action of the cutoff knife 48 allows this function to be performed by a simple mechanism responsive to the drawing stroke of the carriage 10. This eliminates the need for an additional air cylinder and the volume of air necessary to operate the same.

In this disclosure, there is shown and described only the preferred embodiment of the invention, but, as aforementioned, it is to be understood that the invention is capable of various changes or modifications within the scope of the inventive concept as expressed herein.

We claim:

1. In a machine for making a series of packages by transverse seals across a tube of packaging film, the improvement in a sealing carriage comprising a pair of reciprocatory slides, a sealing jaw rigidly mounted on each of said slides, toggle linkage for operating said slides, power means for actuating said linkage, said linkage including a pair of links jointed together for at least one slide, at least one of said links being longitudinally flexible so as to bow along its length and having sufficient resiliency to allow said toggle linkage to travel an additional distance beyond the point along the path of movement of said linkage where said sealing jaws first come together, whereby said sealing jaws come firmly together thus assuring a high-pressure seal during each sealing operation.

2. The combination of claim 1 wherein is provided a pair of links for each slide to allow simultaneous movement of both slides, and a second pair of links at the opposite end of each slide for equal pressure across the width of said jaws.

3. In a machine for making a series of packages by transverse seals across a tube of packaging film, the improvement in a sealing carriage comprising a pair of reciprocatory slides, a sealing jaw rigidly mounted on each of said slides, toggle linkage for operating said slides, power means for actuating said linkage, said linkage including a pair of links jointed together for at least one slide, at least one of said links having sufficient resiliency to allow said toggle linkage to travel an additional distance beyond the point along the path of movement of said linkage where said sealing jaws first come together, said one link including a curved portion, the resiliency being gained by bending of said link so as to tend to straighten the same, whereby said sealing jaws come firmly together thus assuring a high pressure seal during each sealing operation.

4. In a machine for making a series of packages by transverse seals across a tube of packaging film, the improvement in a sealing carriage comprising a pair of reciprocatory slides, a sealing jaw rigidly mounted on each of said slides, toggle linkage for operating said slides, power means for actuating said linkage, said linkage including a pair of links jointed together for each slide to allow simultaneous movement of both slides, at least one of said links having sufficient resiliency to allow said toggle linkage to travel an additional distance beyond the point along the path of movement of said linkage where said sealing jaws first come together, said one link including a curved portion to make the same substantially U-shaped, an elongated straight portion between said curved portions, the resiliency being gained by said straight portion having sufficient flexibility to bow toward the interior of the U when the sealing jaws are brought together during the sealing operation, whereby said sealing jaws come firmly together thus assuring a high-pressure seal during each sealing operation.

5. The combination of claim 1 wherein a second one of each of said pairs of links is integrally formed as a single lever, a shaft for pivotally mounting said lever, said one longitudinally flexible link being substantially longer than the corresponding link of the other pair for increased flexibility and movable through a lesser angle with respect to its sealing jaw, said one link being pivotally connected to said lever at a distance from said shaft proportionally greater than the distance of the corresponding link of the other pair such that said sealing jaws travel substantially the same distance.

6. The combination of claim 5 wherein said power means includes an air cylinder pivotally connected to said lever and to said carriage.

7. In a machine for making a series of packages by transverse seals across a tube of packaging film, the improvement in a sealing jaw carriage comprising a pair of reciprocatory slides, a sealing jaw mounted on each of said slides, means for moving said slides to bring said sealing jaws together, a cutoff knife extending along the length of one of said sealing jaws, an actuator bar for said knife extending in and movable in the direction of movement of said one slide, said actuator bar having an elongated slot closed at least at one of its ends and extending a distance substantially equal to and coextensive with the length of travel of said one slide, operator means engaging said slot and connected to said knife, and means to move said actuator bar to bring said one end of said slot against said operator means to cause said knife to perform the cutting operation.

8. The combination of claim 7 wherein said operator means includes means for pivotally mounting said knife on the one slide so as to sweep outwardly and across with respect to said sealing jaw, a pivotal lever mounted on said slide and connected to said knife and a pin on the end of said lever received in said slot.

9. The combination of claim 8 wherein said operator means includes parallel links at the ends of said knife.

10. The combination of claim 7 wherein is provided spring means on the free end of said actuator bar for mounting the same for floating action to accommodate sidewise movement of said operator means.

11. The combination of claim 10 wherein said spring means comprises a tension spring extending in the plane of said actuator bar and supporting said free end.

12. The combination of claim 10 wherein said operator means includes a pivotal lever solely supporting the end of said actuator bar opposite said spring.

13. The combination of claim 3 wherein is provided an additional curved portion to make said one link substantially U-shaped, an elongated straight portion between said curved portions, the resiliency being gained by said straight portion having sufficient flexibility to bow toward the interior of the U when the sealing jaws are brought together during the sealing operation.

* * * * *